(12) United States Patent
Yanagawa et al.

(10) Patent No.: US 9,688,238 B2
(45) Date of Patent: Jun. 27, 2017

(54) WEBBING TAKE-UP DEVICE

(75) Inventors: Wataru Yanagawa, Aichi-ken (JP);
Masaru Ukita, Aichi-ken (JP);
Yoshiaki Maekubo, Aichi-ken (JP)

(73) Assignee: KABUSHIKI KAISHA TOKAI-RIKA-DENKI-SEISAKUSHO, Aichi-Ken (JP)

( * ) Notice: Subject to any disclaimer, the term of this patent is extended or adjusted under 35 U.S.C. 154(b) by 722 days.

(21) Appl. No.: 13/325,413

(22) Filed: Dec. 14, 2011

(65) Prior Publication Data
US 2012/0175451 A1 Jul. 12, 2012

(30) Foreign Application Priority Data

Jan. 11, 2011 (JP) ................................. 2011-003222

(51) Int. Cl.
*B60R 22/38* (2006.01)
*B60R 22/34* (2006.01)

(52) U.S. Cl.
CPC .......... *B60R 22/3413* (2013.01); *B60R 22/38* (2013.01)

(58) Field of Classification Search
CPC .............. B60R 22/341; B60R 22/3413; B60R 22/4676; B60R 2022/287; B60R 2022/288
USPC ....... 242/379.1; 280/805, 807; 297/470–472, 297/476–478
See application file for complete search history.

(56) References Cited

U.S. PATENT DOCUMENTS

| | | | | | |
|---|---|---|---|---|---|
| 5,026,093 | A | * | 6/1991 | Nishikaji | B60R 22/023 180/268 |
| 5,607,118 | A | * | 3/1997 | Dybro | B60R 22/4676 242/379.1 |
| 5,626,306 | A | * | 5/1997 | Miller, III | B60R 22/4676 242/379.1 |
| 5,785,269 | A | * | 7/1998 | Miller, III | B60R 22/3413 242/379.1 |
| 5,788,281 | A | * | 8/1998 | Yanagi | B60R 21/013 180/282 |
| 5,924,641 | A | * | 7/1999 | Keller | B60R 22/3413 242/379.1 |

(Continued)

FOREIGN PATENT DOCUMENTS

| | | | |
|---|---|---|---|
| JP | 2007-084042 A | 4/2007 | |
| JP | 2010-137837 A | 6/2010 | |
| WO | WO 2010139434 | * 12/2010 | ............. B60R 22/34 |

*Primary Examiner* — Sang Kim
(74) *Attorney, Agent, or Firm* — Roberts Mlotkowski Safran Cole & Calderon P.C.

(57) ABSTRACT

A webbing take-up device including: a spool on which a webbing fitted over an occupant is taken up; a restricting member restricting a rotation of the spool in the pullout direction under specific circumstances; a force limiter mechanism permitting the rotation of the spool in the pullout direction when a force limiter load or a higher load is imparted while the restricting member is restricting the rotation of the spool in the pullout direction; a switching member being capable of switching between a disposed position at a first position and a disposed position at second position, and provided between the first position and the second position; and an operation member being capable of being switched between operation and non-operation, whereby the disposed position of the switching member is switched between the first position and the second position and the force limiter load is switched between a high-load and a low-load.

2 Claims, 10 Drawing Sheets

(56) References Cited

U.S. PATENT DOCUMENTS

| | | | | |
|---|---|---|---|---|
| 5,961,060 A * | 10/1999 | Brambilla | B60R 22/3413 | 242/379.1 |
| 6,012,667 A * | 1/2000 | Clancy, III | B60R 22/3413 | 242/379.1 |
| 6,241,172 B1 * | 6/2001 | Fugel | B60R 22/3413 | 242/379.1 |
| 6,419,178 B1 * | 7/2002 | Kohlndorfer | B60R 22/34 | 242/379.1 |
| 6,676,059 B1 * | 1/2004 | Bell | B60R 22/3413 | 242/379.1 |
| 7,025,297 B2 * | 4/2006 | Bell | B60R 22/3413 | 242/379.1 |
| 7,384,014 B2 * | 6/2008 | Ver Hoven | B60R 22/415 | 242/382.2 |
| 7,571,873 B2 * | 8/2009 | Takamatsu | B60R 22/415 | 242/374 |
| 7,669,794 B2 * | 3/2010 | Boelstler | B60R 22/3413 | 242/379.1 |
| 8,727,257 B2 * | 5/2014 | Dahlquist | B60R 22/3413 | 242/379.1 |
| 9,283,928 B2 * | 3/2016 | Lee | B60R 22/3413 | |
| 2003/0132334 A1 * | 7/2003 | Koning | B60R 21/04 | 242/382 |
| 2003/0222452 A1 * | 12/2003 | Rohrle et al. | 280/805 | |
| 2004/0031872 A1 * | 2/2004 | Schmid | B60R 22/3413 | 242/379.1 |
| 2005/0284978 A1 * | 12/2005 | Zolkower | 242/382.4 | |
| 2007/0001047 A1 | 1/2007 | Yasuda et al. | | |
| 2008/0061180 A1 * | 3/2008 | Webber | B60R 22/3413 | 242/379.1 |
| 2008/0203210 A1 * | 8/2008 | Nagata et al. | 242/396.1 | |
| 2010/0123348 A1 | 5/2010 | Hiramatsu et al. | | |
| 2011/0147509 A1 * | 6/2011 | Wang | B60R 22/3413 | 242/374 |
| 2011/0175425 A1 * | 7/2011 | Churilla | B60R 22/38 | 297/478 |
| 2015/0298649 A1 * | 10/2015 | Wigstrom | B60R 22/3413 | 242/382.1 |

* cited by examiner

WEBBING TAKE-UP DEVICE

CROSS-REFERENCE TO RELATED APPLICATION

This application is claims priority under 35 USC 119 from Japanese Patent Application No. 2011-003222 filed on Jan. 11, 2011, the disclosure of which is incorporated by reference herein.

BACKGROUND

Technical Field

The present invention relates to a webbing take-up device that under specific circumstances permits a spool to rotate in a pullout direction at a force limiter load or higher.

Related Art

In a seatbelt retractor described in Japanese Patent Application Laid-Open (JP-A) No. 2010-137837, rotation of a spool in the pullout direction is permitted either at a high-load force limiter load (load for deforming both a torsion shaft and an energy absorbing plate) or a higher load, or at a low-load force limiter load (load for deforming the torsion shaft) or a higher load.

In this example of a seatbelt retractor, the force limiter load is switched respectively between high-load and low-load by switching a gas generator between non-operation and operation, and accordingly switching between disengagement and engagement, respectively, of an EA operation control member with the energy absorbing plate support member.

In another example of a seatbelt retractor, a force limiter load is switched respectively between high-load and low-load by switching a gas cylinder between operation and non-operation, and accordingly switching between engagement and disengagement, respectively, of an EA operation control member with a stopper operation member.

However, in the first example of a seatbelt retractor, normally the EA operation control member is not engaged with the energy absorbing plate support member, and the EA operation control member is moved by operating the gas generator, engaging the EA operation control member with the energy absorbing plate support member.

Furthermore, in the second example given of a seatbelt retractor, normally the EA operation control member is engaged with the stopper operation member, and the EA operation control member is moved by operating the gas generator such that the EA operation control member is disengaged from the stopper operation member.

This means that the EA operation control member needs to be moved by operation of the gas generator between an engaged position and a disengaged position with respect to the energy absorbing plate support member or the stopper operation member, resulting in the movement stroke of the EA operation control member due to operation of the gas generator being longer, with this possibly resulting in the gas generator becoming more bulky.

SUMMARY

In consideration of the above circumstances the present invention provides a webbing take-up device capable of making an operation member more compact.

A first aspect of the present invention is a webbing take-up device including: a spool on which a webbing adapted to be fitted over an occupant is taken up, and that is rotated in a pullout direction by pulling out the webbing; a restricting member that restricts rotation of the spool in the pullout direction under specific circumstances; a force limiter mechanism that permits rotation of the spool in the pullout direction when a force limiter load or a higher load is imparted while the restricting member is restricting rotation of the spool in the pullout direction; a switching member that is capable of switching between a disposed position at a first position and a disposed position at a second position, and that is provided between the first position and the second position; and an operation member that is capable of being switched between operation and non-operation, whereby the disposed position of the switching member is switched between the first position and the second position and the force limiter load is switched between a high-load and a low-load.

In the webbing take-up device of the first aspect, the webbing adapted to be fitted over the occupant is taken up on the spool and the spool is rotated in the pullout direction by pulling out the webbing.

The force limiter mechanism permits the rotation of the spool in the pullout direction when the force limiter load or the higher load is imparted while the restricting member is restricting rotation of the spool in the pullout direction under specific circumstances. Furthermore, the operation member is switched between operation and non-operation, such that the disposed position of the switching member is switched between the first position and the second position and the force limiter load is switched between a high-load and a low-load.

The switching member is disposed between the first position and the second position. Accordingly the switching member may be moved by operation of the operation member from being disposed between the first position and the second position to being disposed in the first position or the second position. The movement stroke of the switching member due to operation of the operation member can thereby be set small, and the operation member can be made more compact.

A webbing take-up device of a second aspect of the present invention is the webbing take-up device of the first aspect, wherein the switching member includes a placing member that disposes the switching member between the first position and the second position, and wherein the switching member is disposed in either the first position or the second position by movement of the placing member when the operation member is not in operation.

In the webbing take-up device of the second aspect, the placing member disposes the switching member between the first position and the second position, and the switching member is disposed in either the first position or the second position by the movement of the placing member when the operation member is not in operation.

Accordingly, a simple configuration is employed that can dispose the switching member between the first position and the second position, and can dispose the switching member in the first position or the second position when the operation member is not in operation.

A third aspect of the present invention is the webbing take-up device of the first aspect, wherein the switching member is disposed in either the first position or the second position by a biasing force when the operation member is not in operation.

According to the webbing take-up device of the third aspect, the switching member is disposed in either the first position or the second position by the biasing force when the operation member is not in operation. The switching member can accordingly be reliably disposed in the first position or the second position.

BRIEF DESCRIPTION OF THE DRAWINGS

Exemplary embodiments of the present invention will be described in detail based on the following figures, wherein.

DETAILED DESCRIPTION

Explanation follows regarding an exemplary embodiment of the present invention, with reference to the drawings.

Figure 1:
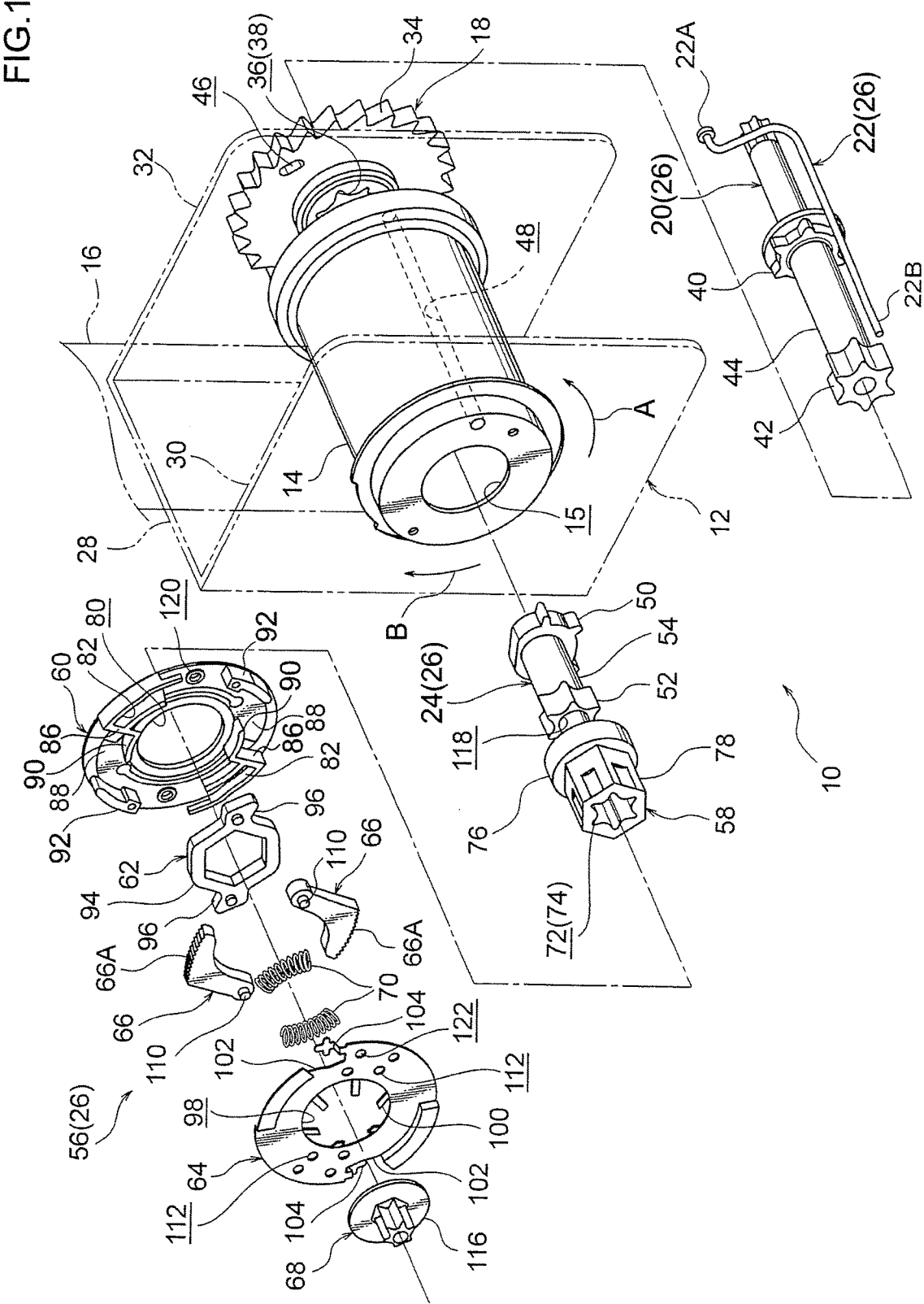
FIG. 1 is an exploded perspective view illustrating relevant portions of a configuration of a webbing take-up device according to an exemplary embodiment of the present invention.
Figure 2:
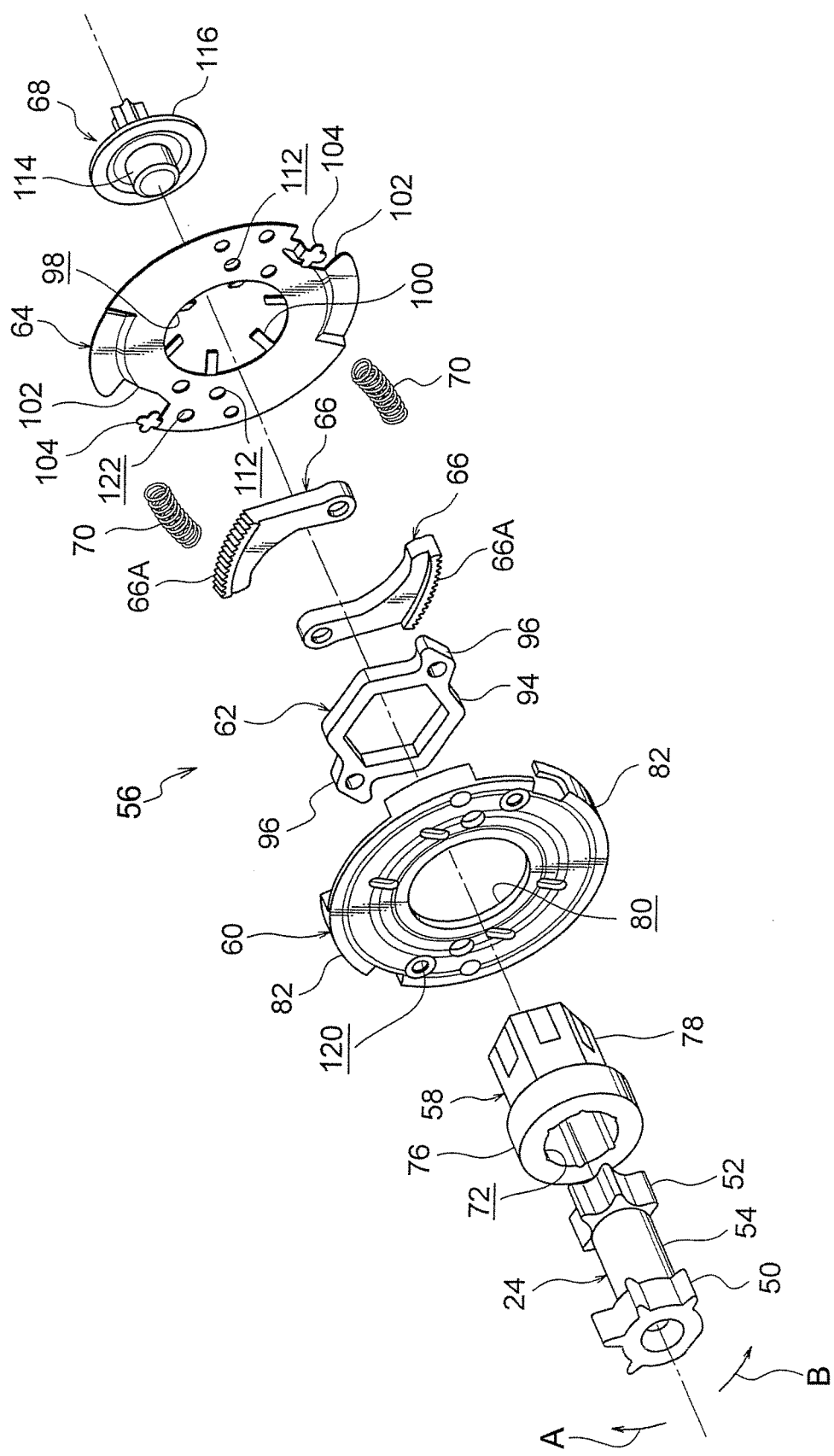
FIG. 2 is an exploded perspective view illustrating a clutch mechanism that is a configuration member of the webbing take-up device illustrated in FIG. 1.
Figure 6:
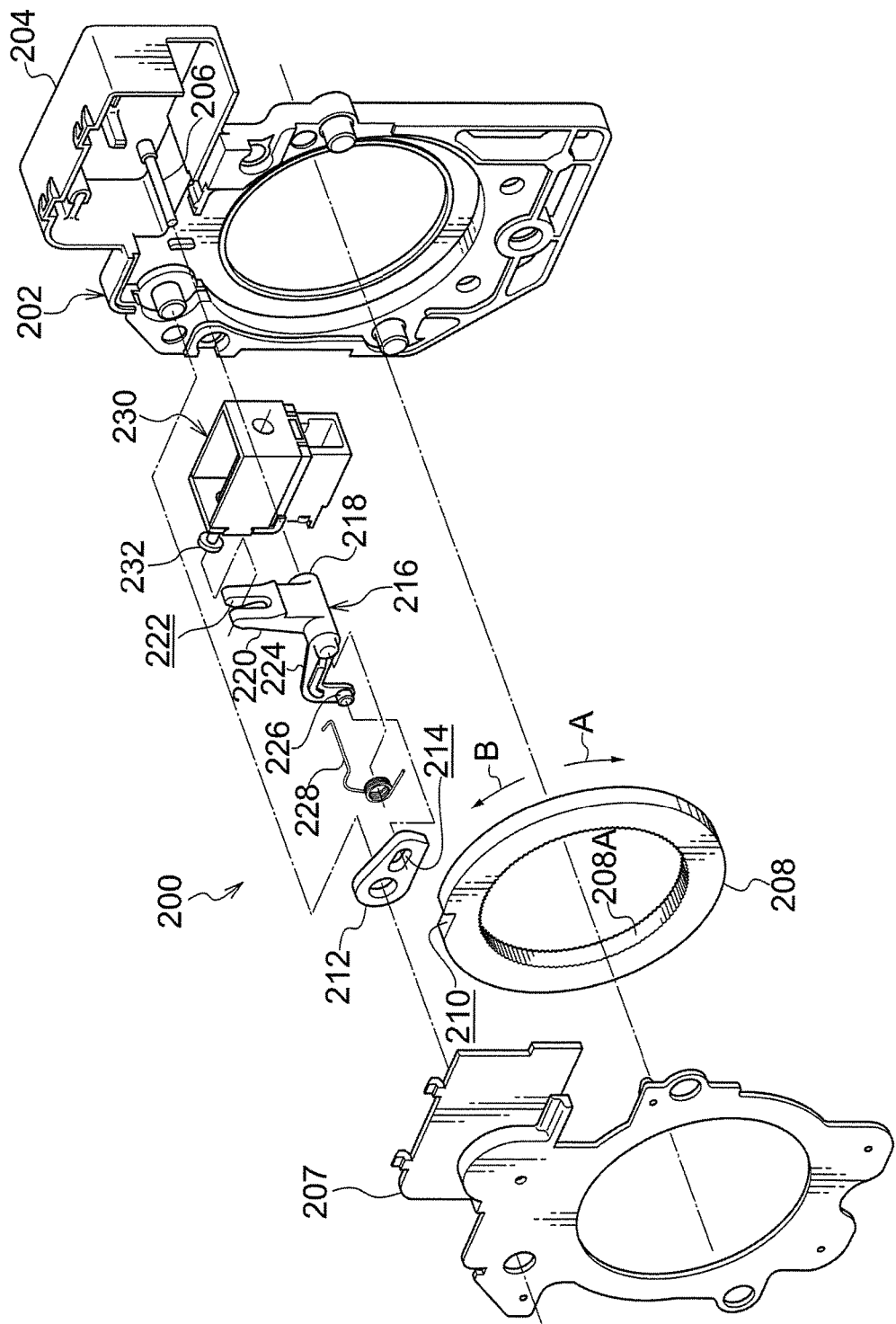
FIG. 6 is an exploded perspective view illustrating a configuration of a switching mechanism that is a configuration member of the webbing take-up device illustrated in FIG. 1.

As shown in FIG. 1, FIG. 2 and FIG. 6, a webbing take-up device 10 according to an exemplary embodiment of the present invention is configured including a frame 12, a spool 14, webbing 16, a lock gear 18 serving as a rotating member, a main torsion shaft 20 serving as a first load imparting member configuring a force limiter mechanism 26, a trigger wire 22 serving as a trigger member, a sub torsion shaft 24 serving as a second load imparting member, a clutch mechanism 56, and a switching mechanism 200 serving as a switching member.

As shown in FIG. 1, the frame 12 is equipped with a plate shaped back plate 28 for fixing to a vehicle. Legs 30, 32 extend out substantially orthogonally from portions at the two width direction ends of the back plate 28, such that the frame 12 is substantially U-shaped in plan view. A known lock mechanism (not shown in the drawings) serving as a restricting member is attached at the outside of the leg 32.

The spool 14 is formed in a circular cylindrical shape with a through hole 15 formed so as to pass through along the axial direction. The spool 14 is disposed between the leg 30 and the leg 32 of the frame 12. The spool 14 is disposed in a state in which its axial direction is aligned along the facing direction of the leg 30 and the leg 32. The spool 14 is rotatably supported by the frame 12 through the main torsion shaft 20 and the sub torsion shaft 24, described later.

The webbing 16 is adapted to be fitted over the body of an occupant, and a portion at the base end side at one length direction end of the webbing 16 is anchored to the spool 14. The spool 14 takes up and stores the webbing 16 from the base end side by rotating in a take-up direction (the arrow A direction, such as in FIG. 1), which is one of the rotation directions.

The lock gear 18 is disposed coaxially to the spool 14 at one axial direction side of the spool 14. A gear portion 34 is formed at an outer peripheral portion of the lock gear 18. A through hole 36 is also formed so as to pass through along the axial direction at a center axis portion of the lock gear 18. Engaged portions 38 are formed in spline shapes to inner peripheral portions of the through hole 36.

In a vehicle emergency (in specific circumstances such as when rapid deceleration occurs), the lock mechanism referred to above is operated when a degree of vehicle acceleration (in particular a degree of deceleration) of a specific acceleration or greater has been detected, or when detected that the webbing 16 is being pulled out from the spool 14 at a particular acceleration or greater. On operation, a lock member (not shown in the drawings) of the lock mechanism engages with the gear portion 34 of the lock gear 18, and restricts (locks) rotation of the lock gear 18 in the pullout direction (the arrow B direction, such as in FIG. 1).

The main torsion shaft 20 is disposed coaxially to the spool 14 and the lock gear 18 so as to pass respectively through the through hole 15 of the spool 14 and the through hole 36 of the lock gear 18. A spline shaped first engaging portion 40 is formed at a length direction central portion of the main torsion shaft 20, and a spline shaped second engaging portion 42 is similarly formed at a leading end portion of the main torsion shaft 20.

The first engaging portion 40 engaging with the engaged portions 38 of the lock gear 18 such that the main torsion shaft 20 is accordingly fixed so as to be rotatable together with the lock gear 18. Due to the second engaging portion 42 engaging with engaged portions, not shown in the drawings, formed at an axial line intermediate portion of the inner peripheral portion of the spool 14, the main torsion shaft 20 is fixed (coupled) to the spool 14 so as to be capable of rotating together with the spool 14.

The portion of the main torsion shaft 20 between the first engaging portion 40 and the second engaging portion 42 configures a first energy absorbing portion 44 for absorbing kinetic energy of the occupant supplied to pull out the webbing 16, described later.

A base end portion 22A of the trigger wire 22 is inserted into a hole 46 formed in the lock gear 18 at a position further to the radial direction outside than the through hole 36, as shown in FIG. 1, and is anchored to the lock gear 18. However, the trigger wire 22 further towards the leading end side than the base end portion 22A is inserted into a hole 48 formed in the spool 14 parallel to the through hole 15, with a leading end portion 22B of the trigger wire 22 projecting out from the spool 14 to the other (second) axial direction side.

The sub torsion shaft 24 is disposed coaxially to the main torsion shaft 20, and the sub torsion shaft 24 further to the base end side than the length direction central portion is inserted into the through hole 15 of the spool 14. However, the sub torsion shaft 24 further towards the leading end side than the length direction central portion projects out from the spool 14 towards the axial direction second end side.

A spline shaped first engaging portion 50 is formed around at least a portion of the base end portion of the sub torsion shaft 24, and a spline shaped second engaging portion 52 is similarly formed at a leading end portion of the sub torsion shaft 24. The first engaging portion 50 engages with an engaged portion, not shown in the drawings, formed at an axial direction intermediate portion of the inner peripheral portion of the spool 14. The sub torsion shaft 24 is thereby fixed (coupled) to the spool 14 so as be capable of rotating together with the spool 14.

The portion of the sub torsion shaft 24 between the first engaging portion 50 and the second engaging portion 52 configures a second energy absorbing portion 54 for absorbing kinetic energy of an occupant supplied to pull out the webbing 16, as described later.

Figure 4:
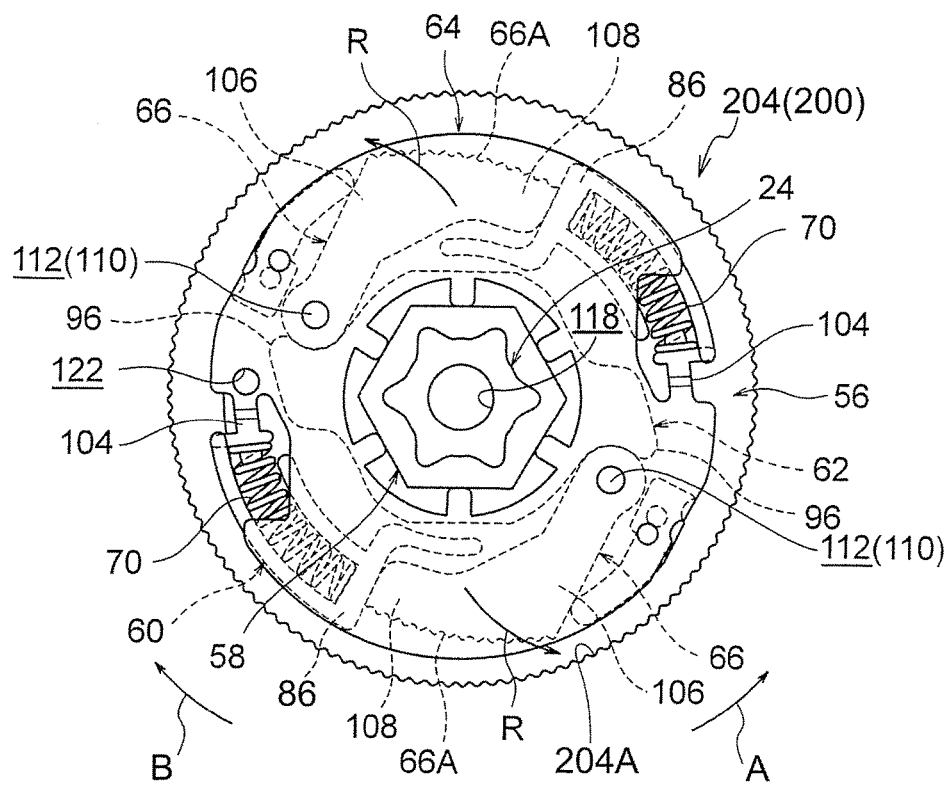
FIG. 4 is a diagram showing an initial state when clutch plates of the clutch mechanism illustrated in FIG. 3 are to be swung towards a lock ring side.
Figure 5:
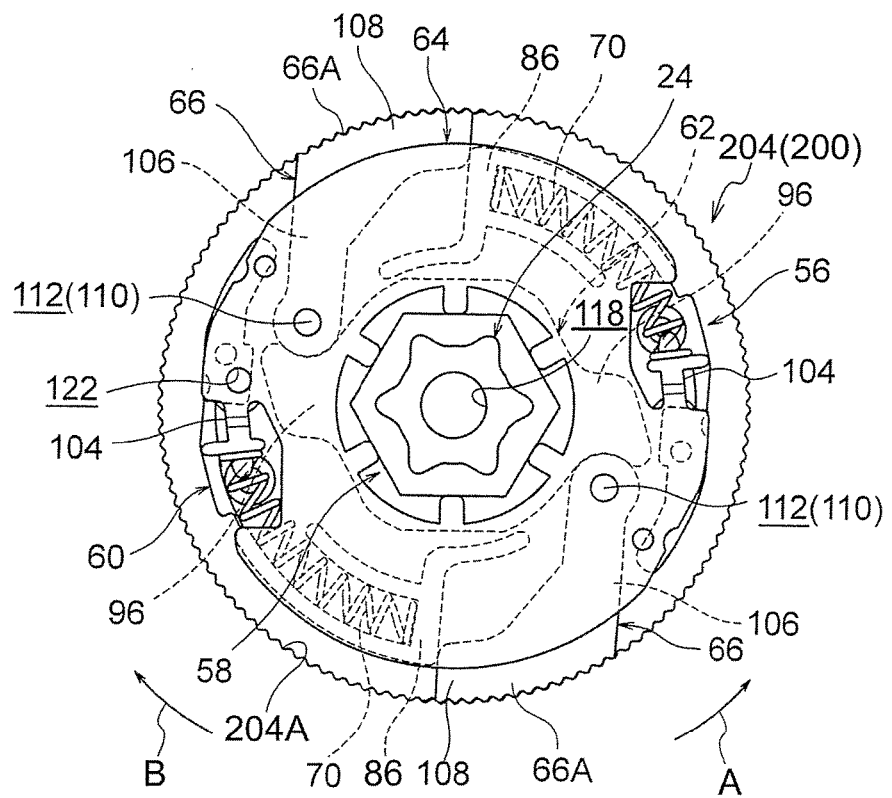
FIG. 5 is a diagram showing a meshed state when clutch plates of the clutch mechanism illustrated in FIG. 3 are meshed with a lock ring.

As shown in FIG. 1 and FIG. 2, the clutch mechanism 56 includes a sleeve 58 serving as a restricting member, a clutch guide 60, a clutch base 62, a clutch cover 64, a pair of clutch plates 66 serving as coupling members, a screw 68, and a pair of coil springs 70. FIG. 4 illustrates a state part way through operation of the clutch mechanism 56, and FIG. 5 shows a state after operation of the clutch mechanism 56 has been completed.

The sleeve 58 is disposed coaxially to the sub torsion shaft 24. A through hole 72 is formed so as to pass through the axial center portion of the sleeve 58 along the axial direction. The sub torsion shaft 24 is inserted with clearance into the through hole 72. A spline shaped engaged portion 74 is formed at an inner peripheral portion of the sleeve 58 on the leading end side. Due to the second engaging portion 52 of the sub torsion shaft 24 engaging with the engaged portion 74, the sleeve 58 is fixed to the sub torsion shaft 24 so as to be capable of rotating together with the sub torsion shaft 24.

The base end side of the sleeve 58 is configured as a support portion 76 having an external circular cylindrical shaped profile, and the sleeve 58 further to the leading end side than the support portion 76 is configured as a fitting portion 78 having an external hexagonal shaped profile.

The clutch guide 60 is made from a resin, and is formed in a ring shape with a through hole 80 passing through along the axial direction. The support portion 76 is fitted into the through hole 80, such that the clutch guide 60 is supported by the sleeve 58 so as to be rotatable relative to the sleeve 58.

Figure 3:
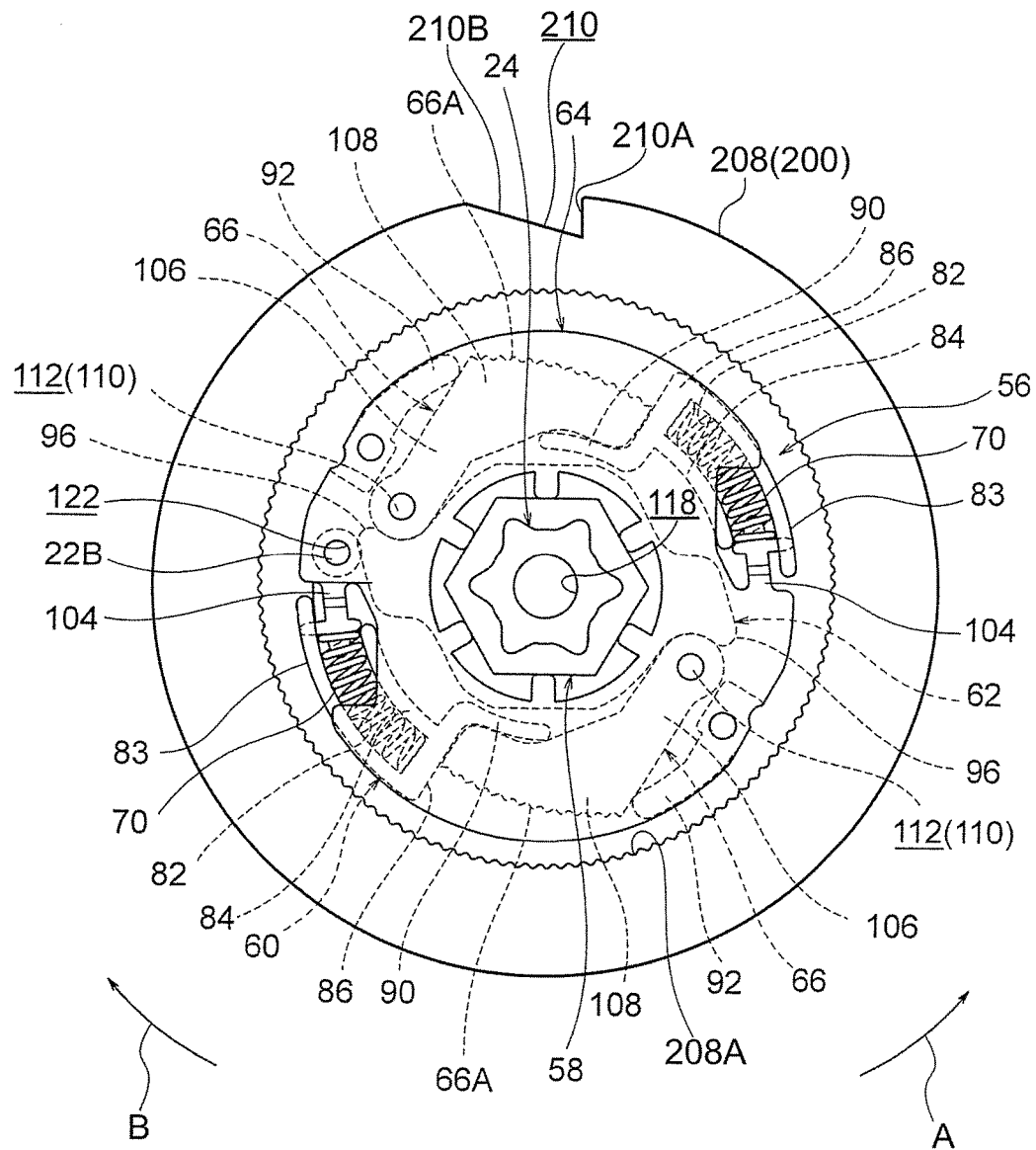
FIG. 3 is a diagram illustrating the clutch mechanism that is a configuration member of the webbing take-up device illustrated in FIG. 1, as seen from the opposite side to a spool.

A pair of coil spring housing portions 82 for housing the coil springs 70 are formed at two locations around the circumferential direction of the clutch guide 60, as shown in FIG. 3. The coil spring housing portions 82 are formed so as to be symmetrical about a point at the center of the central portion of the clutch guide 60. Each of the coil spring housing portions 82 is formed with a substantially U-shaped profile including an outer peripheral wall portion 83 and an inner peripheral wall portion 84 extending along circumferential directions of the clutch guide 60, and a connecting wall portion 86 extending in the clutch guide 60 radial direction for connecting together respective end portions of the outer peripheral wall portion 83 and the inner peripheral wall portion 84.

A pair of clutch plate housing portions 88 in adjacent contact with the respective coil spring housing portions 82 are formed in the clutch guide 60 for housing the clutch plates 66. Each of the clutch plate housing portions 88 are formed with a first support wall portion 90 extending out from the connecting wall portion 86 towards the opposite side to the inner peripheral wall portion 84, and a second support wall portion 92 formed so as to face the opposite side of the connecting wall portion 86 to the outer peripheral wall portion 83, and with a separation to the connecting wall portion 86.

The clutch base 62 is configured with ring shaped fitted portion 94 of hexagonal profile. The fitting portion 78 of the sleeve 58 is fitted (press fitted) into the inside of the fitted portion 94, thereby fixing the clutch base 62 so as to be capable of rotating together with the sleeve 58. Configuration may be made in another exemplary embodiment in which the sleeve 58 and the clutch base 62 are integrally formed. A pair of anchor portions 96 is formed at the clutch base 62 so as to project out from the fitted portion 94 towards the outside. The anchor portions 96 anchor the base end portions of arm portions 106, described later, formed at the clutch plates 66.

The clutch cover 64 is disposed coaxially to the sleeve 58, on the opposite side of the clutch guide 60 to the spool 14 and facing towards the clutch guide 60. The clutch cover 64 is formed with a ring shaped through hole 98 that passes through the clutch cover 64 along the axial direction. Plural fitting tabs 100 are formed around the inner peripheral portion of the through hole 98 so as to project out towards the radial direction inside. The fitting portion 78 of the sleeve 58 is inserted into the through hole 98, and the plural fitting tabs 100 fit into the fitting portion 78, thereby fixing the clutch cover 64 so as to be capable of rotating together with the sleeve 58, and thus also so as to be capable of rotating together with the sub torsion shaft 24. The clutch cover 64 is configured such that cross-shaped tabs 104, described later, engage in the circumferential direction with respect to the clutch guide 60, and the clutch guide 60 is disposed so as to be relatively rotatable with respect to the clutch cover 64 between an operation position shown in FIG. 5 and a non-operation position shown in FIG. 3.

Cutout portions 102, of an indented shape open to the radial direction outside when viewed along the axial direction, are formed respectively at two locations along the circumferential direction of the clutch cover 64. The pair of cross-shaped tabs 104 are formed so as to be positioned on the clutch cover 64 at the inside of the respective cutout portions 102. The pair of cross-shaped tabs 104 is formed so as to be symmetrical about a point at the center of the central portion of the clutch cover 64. Each of the cross-shaped tabs 104 bends around in a crank shape when viewed along the clutch cover 64 radial direction, such that the leading end sides of the cross-shaped tabs 104 project out further to the clutch guide 60 side than the base end sides of the cross-shaped tabs 104.

The leading end side of each of the cross-shaped tabs 104 is provided with an inside projection portion projecting towards the clutch guide 60 radial direction inside, an outer projection portion projecting towards the clutch guide 60 radial direction outside, and a circumferential direction projection portion projecting out towards one direction (the take-up direction) out of the clutch guide 60 circumferential directions. A cross shape is accordingly formed at the leading end side of each of the cross-shaped tabs 104 when viewed along the clutch guide 60 axial direction.

The clutch plates 66 are disposed between the clutch cover 64 and the clutch guide 60. Each of the clutch plates 66 has an arm portion 106 and a circular arc portion 108 formed at the leading end portion of the arm portion 106. A rotation shaft 110 is also formed so as to project out from a base end portion of each of the arm portions 106 towards the clutch cover 64 side and along the sub torsion shaft 24 axial direction. Each of the rotation shafts 110 is inserted in a hole 112 formed in the clutch cover 64, and the clutch plates 66 are rotatably supported on the clutch cover 64. Straight knurled teeth 66A are formed at an outer peripheral portion of the circular arc portions 108 (at the leading end portion of the clutch plates 66).

The screw 68 is configured with a threaded portion 114 and a pressing portion 116 with a larger diameter than the threaded portion 114. The threaded portion 114 meshes with a threaded hole 118 formed at a leading end portion of the sub torsion shaft 24, and the screw 68 is thereby fixed to the leading end portion of the sub torsion shaft 24. Accordingly, the leading end portion of the sleeve 58 makes contact with the pressing portion 116 when the screw 68 is in a fixed state to the leading end portion of the sub torsion shaft 24. Movement of the sleeve 58 in the direction to come out from the sub torsion shaft 24 is thereby restricted. In this state the clutch guide 60 is restricted from moving in the axial direction due to the clutch cover 64 and the spool 14.

Holes 120, 122 are formed in the clutch guide 60 and the clutch cover 64, respectively. The holes 120, 122 are formed so as to face each other when the clutch guide 60 is disposed in the non-operation position with respect to the clutch cover 64, and the leading end portion 22B of the trigger wire 22 is inserted into the holes 120, 122. The clutch guide 60 is thereby restricted from rotating relative to the spool 14 and the clutch cover 64 when disposed in the non-operation position (the clutch guide 60 is restrained in the non-operation position).

Furthermore, when the clutch guide 60 is in the restrained state of the non-operation position as described above, the cross-shaped tabs 104 of the clutch cover 64 are each positioned in the vicinity of the respective opening of the coil spring housing portions 82 of the clutch guide 60. The portion of each of the cross-shaped tabs 104 projecting in the circumferential direction is inserted inside the coil springs 70 from one (first) axial direction end of the coil springs 70 housed in the coil spring housing portions 82, and the inner peripheral portion and the outer projection portion of each of the cross-shaped tabs 104 make contact with portions at the first axial direction end of the coil springs 70. The first axial direction end portion of each of the coil springs 70 is accordingly anchored by the cross-shaped tab 104. The second axial direction end portion of each of the coil springs 70 is anchored to the connecting wall portion 86 of the coil spring housing portions 82 (see FIG. 3).

In this state, the separation between the cross-shaped tabs 104 and the connecting wall portion 86 is smaller than the overall length of the coil springs 70 when in the free state, such that the coil springs 70 are in a compressed state. A biasing force is thereby applied in the take-up direction to the clutch guide 60, biasing the clutch guide 60 towards the operation position.

In this state, there is sufficient separation secured between the hole 112 of the clutch cover 64 (the rotation shaft 110 of the clutch plates 66) and the connecting wall portion 86, such that the clutch plates 66 are housed in the clutch plate housing portions 88 with the knurled teeth 66A further to the inside than the outer peripheral portion of the clutch guide 60. The connecting wall portion 86 makes contact with the leading end of the circular arc portions 108 in this state.

Figure 7:
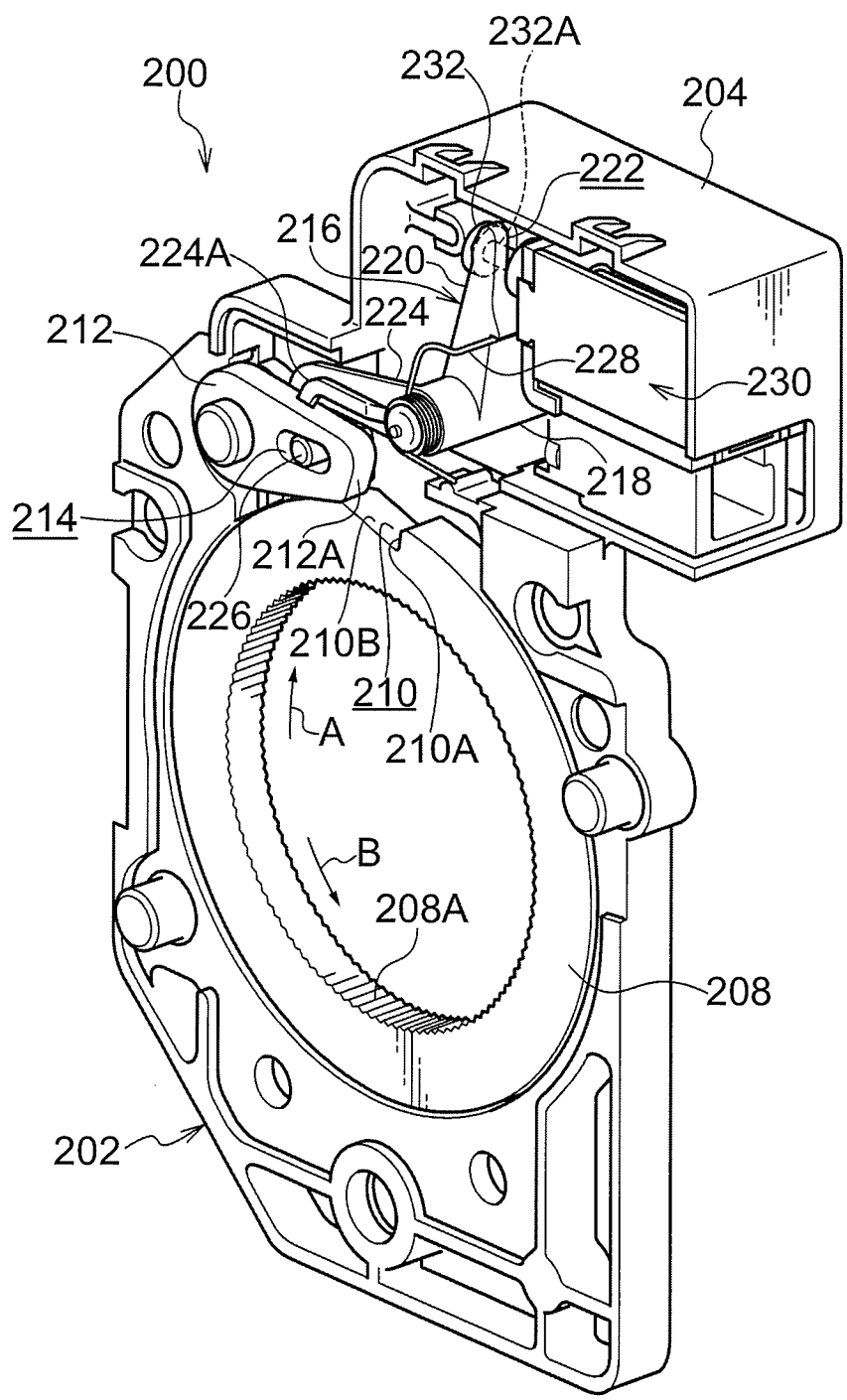
FIG. 7 is a perspective view illustrating a configuration of the switching mechanism illustrated in FIG. 6.
Figure 8:
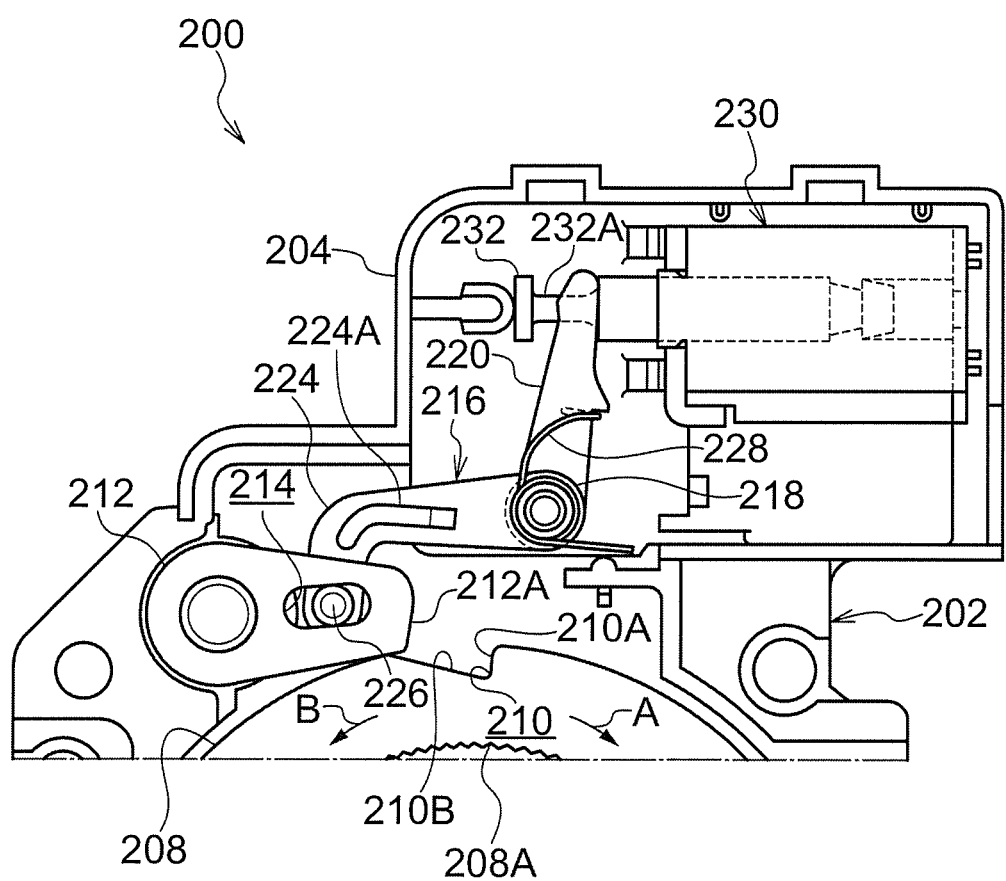
FIG. 8 is a side view as seen from the opposite side to a spool illustrating a state prior to starting to rotate a lock ring of the switching mechanism illustrated in FIG. 6.

As shown in FIG. 6 to FIG. 8, the switching mechanism 200 is provided with a box shaped body 202, and the body 202 is fixed at the outside of the leg 30 of the frame 12. A substantially rectangular box shaped case 204 is formed at an upper portion of the body 202. The case 204 has an elongated pillar shaped support shaft 206 integrally formed inside at a lower portion so as to project out from the case 204 towards the opposite side to the leg 30.

The inside of the body 202 is open towards the leg 30 side, and closed off by a sheet 207 on the leg 30 side of the body 202. The clutch mechanism 56 passes though the sheet 207 and the clutch mechanism 56 is inserted into the body 202.

A circular ring plate shaped lock ring 208 serving as a placing member is rotatably supported inside the body 202, with the lock ring 208 disposed at the outer peripheral side of the clutch mechanism 56 and coaxially to the clutch mechanism 56. Straight knurled teeth 208A are formed at an inner peripheral portion of the lock ring 208.

A lock hole 210 of triangular profile cross-section is formed as a lock portion at an upper portion of the lock ring 208, and the lock hole 210 is open towards the outer peripheral side of the lock ring 208. The face on the take-up direction side of the lock hole 210 configures a lock face 210A and is disposed perpendicular to the circumferential direction of the lock ring 208, and the face on the pullout direction side of the lock hole 210 configures a mounting face 210B that slopes with respect to a tangential direction to rotation of the lock ring 208.

Figure 9:
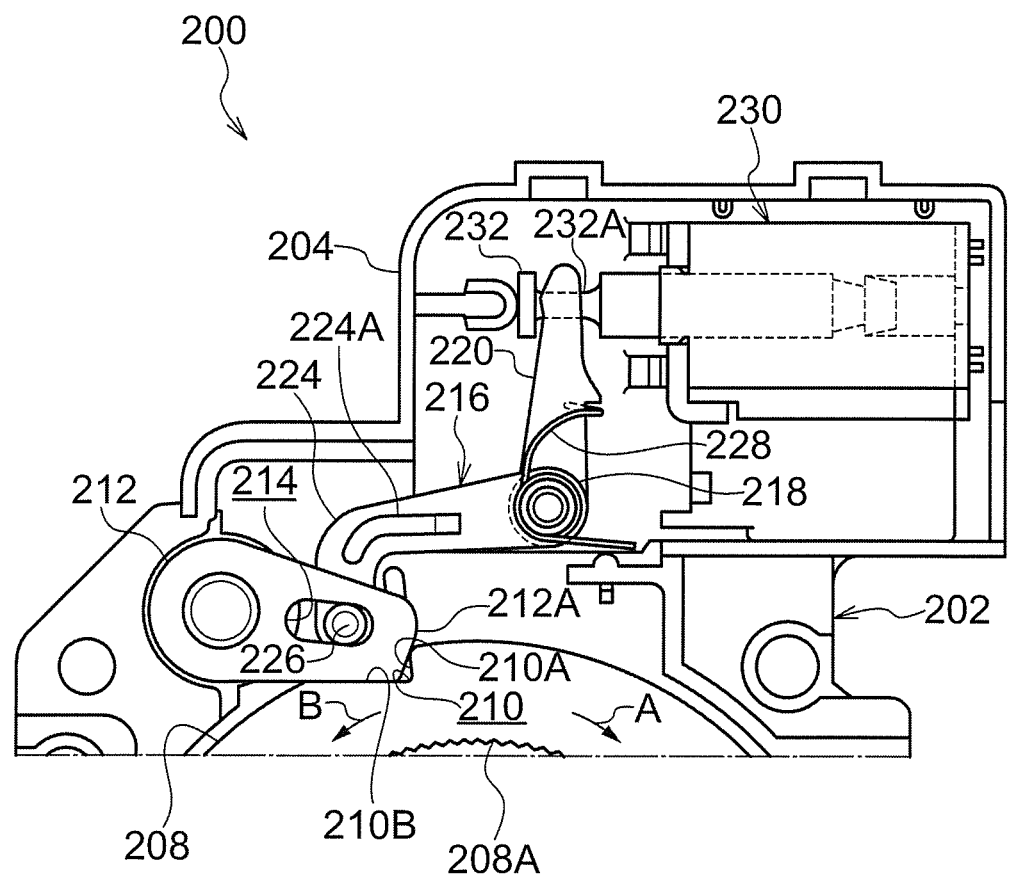
FIG. 9 is a side view as seen from the opposite side to a spool illustrating a state in which rotation of the lock ring of the switching mechanism illustrated in FIG. 6 has been locked.
Figure 10:
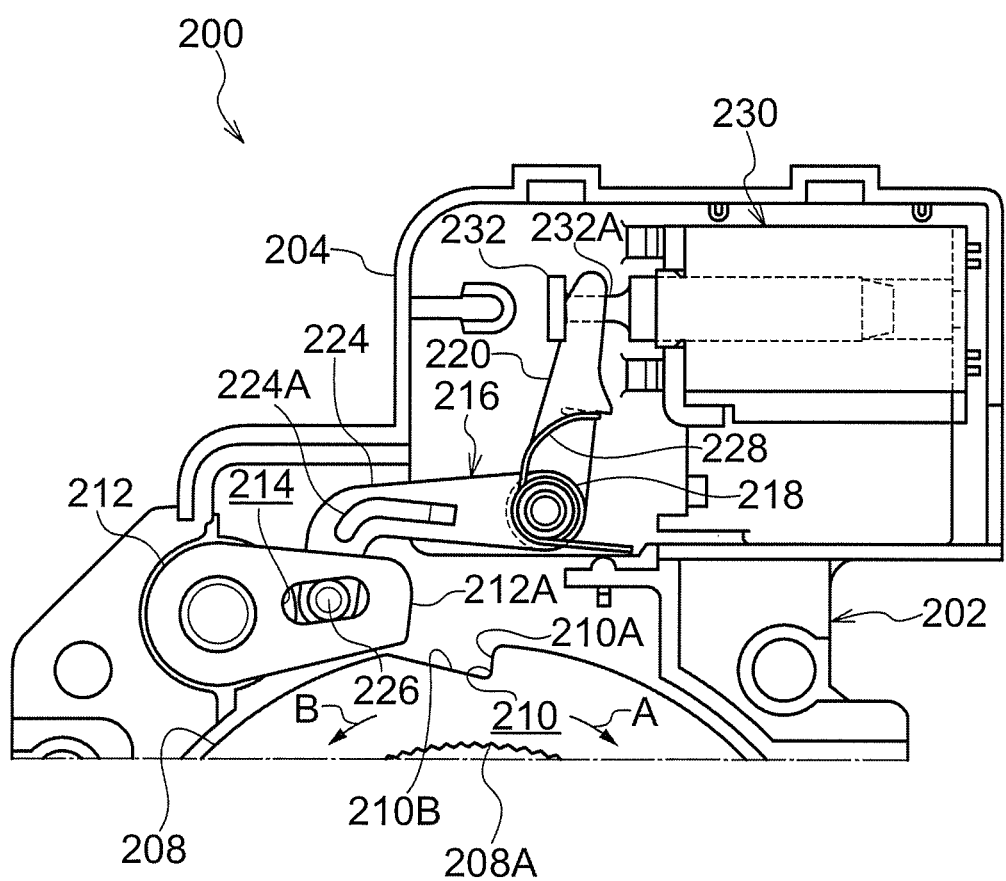
FIG. 10 is a side view as seen from the opposite side to a spool illustrating a state in which the lock ring of the switching mechanism illustrated in FIG. 6 is permitted to rotate.

A metal-formed substantially rectangular plate shaped pawl 212 serving as a switching member is disposed inside the body 202 above the lock ring 208 with a base end portion of the pawl 212 rotatably supported. The pawl 212 is capable of swinging so to be disposed in a lock position (see FIG. 9) serving as one disposed position at a first position or a second position, and a release position (see FIG. 10) serving as the other disposed position at the first position or the second position. An elongated swing hole 214 is formed so as to pass through a leading end portion of the pawl 212. The length direction of the swing hole 214 is parallel to the rotation radial direction of the pawl 212. The leading end face of the pawl 212 is configured by a contact face 212A disposed substantially perpendicular to the rotation radial direction of the pawl 212.

A link lever 216, serving as a coupling member and formed from resin, is disposed inside the body 202 above the lock ring 208. A circular cylindrical shaped support cylinder 218 is formed at the link lever 216, and the link lever 216 is rotatably supported on the body 202 due to the support cylinder 218 being rotatably supported on the support shaft 206 inside the case 204.

A plate shaped coupling plate 220 is formed at an upper portion of the link lever 216, with the coupling plate 220 integrated to the support cylinder 218. An elongated coupling hole 222 is formed so as to pierce through the coupling plate 220, and the coupling hole 222 is open towards the top side.

An L-profile plate shaped swing plate 224 is formed at a lower portion of the link lever 216, with the swing plate 224 configured thinner than the coupling plate 220. The base end of the swing plate 224 is integrated to the support cylinder 218, and the portion on the base end side of the swing plate 224 (the upper side portion) extends out along the link lever 216 rotation radial direction, and the portion on the leading end side of the swing plate 224 (the lower side portion) extends out along the link lever 216 rotation tangential direction. An L-profile bar shaped rib 224A is formed at a length direction intermediate portion of the swing plate 224, and the rib 224A reinforces the swing plate 224.

The leading end portion of the swing plate 224 (the lower portion of the link lever 216) is disposed at the body 202 side of the pawl 212. A circular cylindrical shaped coupling shaft 226 is formed projecting out from the leading end of the swing plate 224, and the coupling shaft 226 is inserted into the swing hole 214 of the pawl 212. The link lever 216 thereby swings, and the pawl 212 also swings due to the swing plate 224 swinging. The leading end portion of the swing plate 224 coincides with the portion below the rib 224A of the swing plate 224.

A return spring 228 (torsion coil spring) serving as a placing member is retained in the support cylinder 218 of the link lever 216. One end of the return spring 228 is anchored to the coupling plate 220 of the link lever 216, and the other end of the return spring 228 is anchored to the body 202. The return spring 228 biases the link lever 216 in the direction in which the swing plate 224 swings towards the lock ring 208 side (referred to below as the lock direction, with the opposite direction referred to as the release direction), thereby biasing the pawl 212 in the direction in which the pawl 212 swings towards the lock ring 208 side (referred to below as the lock direction, with the opposite direction referred to as the release direction). The pawl 212 accordingly makes contact with the outer peripheral face of the lock ring 208 at the pullout direction side end of the lock hole 210, and is disposed between a lock position and a release position.

Figure 11:
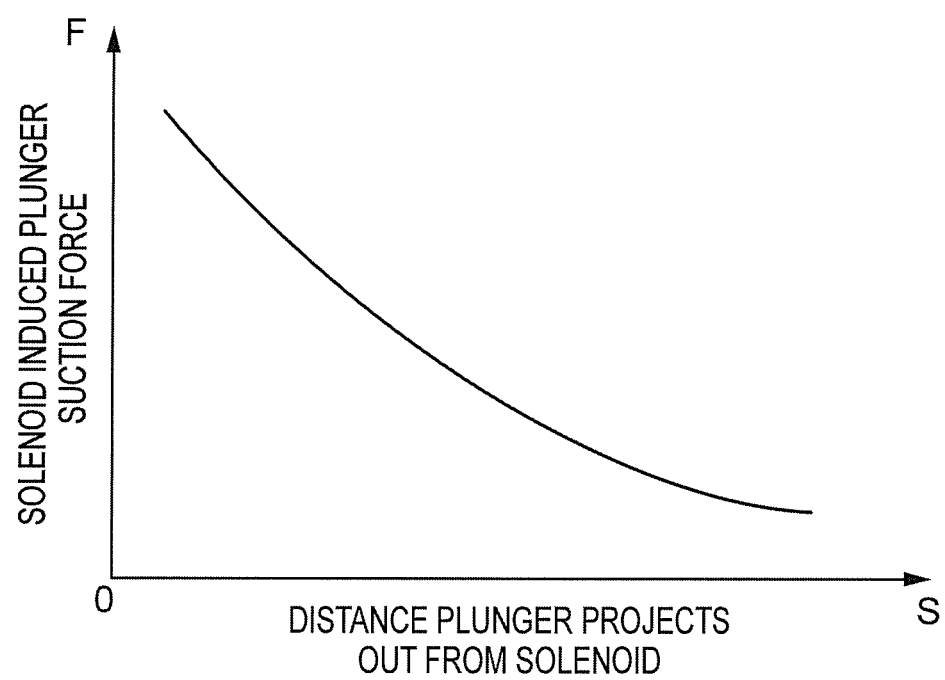
FIG. 11 is a graph showing a relationship between distance a plunger projects out from a solenoid to the suction force on the plunder induced by a solenoid.

A solenoid 230 serving as an operation member is fixed inside the case 204 of the body 202. A metal pillar shaped plunger 232 serving as an operation member is provided inside the solenoid 230. The leading end portion of the plunger 232 projects out from the solenoid 230, and a small diameter portion 232A is formed in the vicinity of the leading end of the plunger 232 with a comparatively smaller diameter than other locations of the plunger 232. The small diameter portion 232A of the plunger 232 passes through the coupling hole 222 of the coupling plate 220 of the link lever 216, and the plunger 232 is accordingly coupled to the link lever 216 with the coupling plate 220 in a separated state from the leading end of the plunger 232. The solenoid 230 is electrically connected to a vehicle control device (not shown in the drawings) serving as control member, and when the solenoid 230 has been operated under control from the control device, the coupling plate 220 of the link lever 216 is pressed by the leading end of the plunger 232 due to the plunger 232 being pulled (moved) into the solenoid 230, swinging the link lever 216 towards the release direction. When the solenoid 230 is operated, the suction force (moving force) on the plunger 232 towards the inside of the solenoid 230 is greater the smaller the amount by which the plunger 232 projects out from the solenoid 230 (see FIG. 11).

The control device is also electrically connected to an impact prediction member and a body frame detection member. The impact prediction member predicts a vehicle impact, for example by employing an acceleration sensor to detect vehicle acceleration (and in particular rapid deceleration), and/or a distance sensor to detect the separation distance to obstacles in front of the vehicle. The body frame detection member detects the body frame of an occupant seated in a seat, by for example employing a weight sensor for detecting load acting on a vehicle seat, and/or a belt sensor for detecting the amount of the webbing 16 that has been pulled out from the spool 14 illustrated in FIG. 1.

The webbing take-up device 10 of the present exemplary embodiment is configured with the following actions.

The spool 14, the lock gear 18, the main torsion shaft 20, the sub torsion shaft 24 and the clutch mechanism 56 (including the sleeve 58, the clutch base 62, the clutch plates 66 and the screw 68) are configured so as to be capable of rotating together in the take-up direction and the pullout direction.

The webbing 16 is adapted to be fitted over the body of a vehicle occupant by pulling the webbing 16 out from the spool 14.

In a state in which the webbing 16 is fitted over the body of a vehicle occupant, rotation of the lock gear 18 in the pullout direction is restricted when the lock mechanism is operated, for example when a sudden deceleration state occurs.

Rotation in the pullout direction of the spool 14 that is coupled to the lock gear 18 through the main torsion shaft 20 is accordingly also restricted, and the webbing 16 is restricted from being pulled out from the spool 14. The body of the occupant attempting to move in the vehicle forward direction is accordingly restrained by the webbing 16.

Furthermore, in a state in which rotation of the lock gear 18 in the pullout direction is restricted, when an even greater force from the body of the occupant acts to pull the webbing 16, if the rotational force on the spool 14 in the pullout direction arising from this pulling force exceeds the twisting resistance load (deformation resistance load) of the first energy absorbing portion 44 of the main torsion shaft 20, the force limiter mechanism 26 is actuated, and rotation of the spool 14 in the pullout direction is permitted by the first energy absorbing portion 44 twisting (deforming) at the force limiter load (the twisting resistance load of the first energy absorbing portion 44) or above.

Accordingly, the webbing 16 is pulled out from the spool 14 by the rotation of the spool 14 in the pullout direction due to twisting of the first energy absorbing portion 44. The load (strain) imposed on the chest region of the occupant by the webbing 16 is accordingly reduced, and the kinetic energy of the occupant applied to pull out the webbing 16 is absorbed according to the amount of twisting of the first energy absorbing portion 44.

Furthermore, rotation of the spool 14 with respect to the lock gear 18 in the pullout direction is equivalent, relatively speaking, to rotation of the lock gear 18 with respect to the spool 14 in the take-up direction. Accordingly, when the lock gear 18 relatively rotates in the take-up direction with respect to the spool 14, portions of the trigger wire 22 further towards the base end side than the base end portion 22A remain inserted in the hole 48 of the spool 14, however the base end portion 22A of the trigger wire 22 moves in the main torsion shaft 20 circumferential direction, and thus portions of the trigger wire 22 to the leading end side of the base end portion 22A are pulled towards the lock gear 18 side relative to the hole 48.

The leading end portion 22B of the trigger wire 22 is accordingly pulled out from the hole 120 of the clutch guide 60 and the hole 122 of the clutch cover 64, releasing restriction on the relative rotation of the clutch guide 60 with respect to the spool 14 and the clutch cover 64.

When the clutch guide 60 then swings from the non-operation position to the operation position under the biasing force from the coil springs 70, the separation distance between the hole 112 of the clutch cover 64 (the rotation shaft 110 of the clutch plates 66) and the connecting wall portion 86 of the clutch guide 60 gets smaller, and the leading end of each of the circular arc portions 108 of the clutch plates 66 is pressed (guided) by the respective connecting wall portion 86 towards the direction of contact with the clutch guide 60. Each of the clutch plates 66 therefore swings towards the lock ring 208 side (see arrow R direction in FIG. 4), such that the knurled teeth 66A of the clutch plates 66 mesh with the knurled teeth 208A of the lock ring 208 (the state illustrated in FIG. 5). The clutch plates 66 and the lock ring 208 are thus coupled together. When this occurs, the clutch plates 66 are pressed against the lock ring 208 due to the anchor portions 96 formed at the clutch base 62 pressing the base end portion of the arm portion 106 of the clutch plates 66 towards the pullout direction, thereby maintaining a coupled state of the two components. The lock ring 208 is thus rotated in the pullout direction together with the pullout direction rotation of the clutch mechanism 56 (the sleeve 58, the clutch base 62 and the clutch plates 66).

When the control device has determined that the body frame of the occupant is a predetermined standard value or greater based on a signal from the body frame detection member, the solenoid 230 is not operated prior to operating the lock member (when a vehicle impact is predicted by the impact prediction member or when the body frame detection member has detected that the occupant is seated in a seat). Due to the lock ring 208 rotating in the pullout direction as described above, the link lever 216 swings in the lock direction due to the biasing force of the return spring 228 (the coupling plate 220 of the link lever 216 moves the small diameter portion 232A of the plunger 232 towards the leading end side of the plunger 232), swinging the pawl 212 towards the lock direction. The pawl 212 is thereby inserted into the lock hole 210 of the lock ring 208 so as to be disposed in the lock position. Accordingly, the pawl 212 is in a mounted state to (in face contact with) the mounting face 210B of the lock hole 210, and the contact face 212A makes contact with the lock face 210A of the lock hole 210 (see FIG. 9).

By locking (restricting) rotation of the lock ring 208 in the pullout direction, rotation of the clutch mechanism 56 (the sleeve 58, the clutch base 62 and the clutch plates 66) in the pullout direction is also restricted.

In the state in which rotation of the sleeve 58 in the pullout direction is restricted, when the body of the occupant then pulls out the webbing 16 with even greater force, if rotation force on the spool 14 in the pullout direction arising from this pulling force exceeds the sum of the twisting resistance load (deformation resistance load) of the first energy absorbing portion 44 of the main torsion shaft 20 and the twisting resistance load (deformation resistance load) of the second energy absorbing portion 54 of the sub torsion shaft 24, rotation of the spool 14 in the pullout direction is permitted by twisting (deformation) of the first energy absorbing portion 44 and the second energy absorbing portion 54 at the force limiter load (the sum of the twisting resistance load of the first energy absorbing portion 44 and the twisting resistance load of the second energy absorbing portion 54) or a higher load.

The spool 14 accordingly rotates in the pullout direction due to twisting of the first energy absorbing portion 44 and the second energy absorbing portion 54, and due to webbing 16 being pulled out from the spool 14, the load (strain) from the webbing 16 imposed on the chest region of the occupant is reduced, and kinetic energy of the occupant applied to pull the webbing 16 is absorbed by the amount of twisting of the first energy absorbing portion 44 and the second energy absorbing portion 54.

However, when it is has been determined that the body frame of the occupant is less than the predetermined standard value based on the signal from the body frame detection member, the solenoid 230 is operated under control of the control device prior to lock mechanism operation (when the impact prediction member has predicted a vehicle impact or when the body frame detection member has detected an occupant sitting in the seat). The plunger 232 is therefore pulled into the solenoid 230, and due to the link lever 216 being moved in the release direction by the plunger 232, the pawl 212 is swung in the release direction and disposed in the release position (see FIG. 10).

The pawl 212 is separated upwards from the outer peripheral face of the lock ring 208 and rotation of the lock ring 208 in the pullout direction is permitted, enabling the lock ring 208 to rotate in the pullout direction together with the clutch mechanism 56 (the sleeve 58, the clutch base 62 and the clutch plates 66) and the spool 14. As a result, since no twisting of the second energy absorbing portion 54 occurs, the spool 14 is permitted to rotate in the pullout direction by twisting (deformation) of the first energy absorbing portion 44 at the force limiter load (the twisting resistance load of the first energy absorbing portion 44) or a higher load.

Namely, the force limiter load is set as a high load, which is the sum of the twisting resistance load of the first energy absorbing portion 44 and the twisting resistance load of the second energy absorbing portion 54, when the body frame of an occupant is a predetermined standard value or greater. However, when the body frame of an occupant is less than the predetermined standard value the force limiter load is set as a lower load, which is the twisting resistance load of the first energy absorbing portion 44. Appropriate protection can accordingly be achieved corresponding to the body frame of an occupant.

In the switching mechanism 200 the pawl 212 makes contact with the outer peripheral face of the lock ring 208, and is disposed between the lock position and the release position. Due to operation of the solenoid 230 (pulling the plunger 232 into the solenoid 230 and swinging the link lever 216 in the release direction), the pawl 212 may swing from being disposed between the lock position and the release position to being disposed in the release position. As a result, the angle of swing of the pawl 212 by operation of the solenoid 230 can be reduced, the rotation angle of the link lever 216, and thus the movement stroke of the plunger 232, by operation of the solenoid 230 can also be reduced, enabling the solenoid 230 to be achieved with a configuration that is more compact, lower weight, lower power (with less power supplied) and lower cost.

The coupling plate 220 of the link lever 216 is also disposed at a distance from the leading end of the plunger 232. The smaller the projection distance of the plunger 232 from the solenoid 230 when the solenoid 230 is operated, the greater the force pulling the plunger 232 into the solenoid 230. As a result, the leading end of the plunger 232 can make contact with the coupling plate 220 when the solenoid 230 is operated in a state in which a large suction force is pulling the plunger 232 into the solenoid 230, to initiate rotation of the link lever 216. The solenoid 230 can thus be achieved with a configuration that is even more compact, lower weight, lower power (with less power supplied) and lower cost.

The lock ring 208 disposes the pawl 212 between the lock position and the release position, and when the solenoid 230 has not been operated, the pawl 212 is inserted into the lock hole 210 of the lock ring 208 by rotation of the lock ring 208 in the pullout direction, thereby disposing the pawl 212 in the lock position. Accordingly a simple configuration is employed that enables the pawl 212 to be disposed between the lock position and the release position, and enables the pawl 212 to be disposed in the lock position when the solenoid 230 has not been operated.

The pawl 212 is disposed in the lock position when the solenoid 230 has not been operated by the biasing force of the return spring 228. The pawl 212 can accordingly be reliably disposed in the lock position.

The metal-formed pawl 212 is coupled to the metal-formed plunger 232 of the solenoid 230 through the resin-formed link lever 216. Therefore, in contrast to cases in which a bulky pawl 212 is configured for directly coupling to the plunger 232, the pawl 212 can be made more compact within a range that achieves the strength required for rotating the lock ring 208 in the pullout direction for locking. The pawl 212 can thus be made lighter in weight, the components driven by the solenoid 230 (the pawl 212 and the link lever 216) can be made lighter in weight, and the solenoid 230 can thus be of a configuration that is even more compact, lower weight, lower power (with less power supplied) and lower cost.

However, due to the pawl 212 being coupled to the plunger 232 of the solenoid 230 through the link lever 216, the drive load on the pawl 212 from the solenoid 230 and the swing stroke of the pawl 212 can be readily adjusted by such measures as adjusting the size of the link lever 216.

The portion on the leading end side of the swing plate 224 of the link lever 216 (the lower side portion) extends in a rotation tangential direction of the link lever 216. Accordingly, when the link lever 216 swings the pawl 212, a load acts from the pawl 212 on the leading end side portion of the swing plate 224 in a direction along the length direction of the swing plate 224 (load from the pawl 212 is suppressed from acting in directions not along the swing plate 224 length direction), and so not only can excellent swinging of the pawl 212 be achieved by rotation of the link lever 216, but also breakage of the swing plate 224, and in particular the thinned portions (the portions where the rib 224A is not formed) can be prevented. However, space saving can be achieved due to the leading end portion of the swing plate 224 coinciding with a thinned portion on the swing plate 224.

The drive device of the pawl 212 is the solenoid 230. As a result, re-operation can be achieved after the solenoid 230 has been operated without needing to replace the solenoid 230. Accordingly, after the solenoid 230 has been operated due to a vehicle impact being predicted by the impact prediction member, if the vehicle impact itself is actually avoided, then such a configuration enables the control device to operate the solenoid 230 when a vehicle impact is again predicted by the impact prediction member without replacing the solenoid 230. As a result, in contrast to a configuration in which the drive device of the pawl 212 mush be replaced after operation, driving of the pawl 212 can be employed to switch the force limiter load set when a vehicle impact is predicted. A simple configuration of the drive device for the pawl 212 can also be achieved, together with savings in cost and weight.

In the present exemplary embodiment, due to the biasing force from the return spring 228, the pawl 212 is caused to make contact with the outer peripheral face of the lock ring 208 and to be disposed between the lock position and the release position, and when the solenoid 230 has not been operated the pawl 212 is inserted into the lock hole 210 of the lock ring 208 so as to be disposed in the lock position. However, configuration may be made without provision of the return spring 228, such that under the weight of the pawl 212 itself the pawl 212 is caused to make contact with the outer peripheral face of the lock ring 208 and to be disposed between the lock position and the release position, and when the solenoid 230 is not operated the pawl 212 inserted into the lock hole 210 of the lock ring 208 so as to be disposed in the lock position.

In the present exemplary embodiment, the pawl 212 is disposed in the lock position when the solenoid 230 has not been operated, and the pawl 212 is disposed in the release position when the solenoid 230 has been operated. However, configuration may be made such that the pawl 212 is disposed in the release position when the solenoid 230 has not been operated, and the pawl 212 is disposed in the lock position when the solenoid 230 has been operated.

In the present exemplary embodiment the force limiter load is high-load when the pawl 212 has been disposed in the lock position, and the force limiter load is low-load when the 212 has been disposed in the release position. However, configuration may be made such that the force limiter load is low-load when the pawl 212 is disposed in the lock position, and the force limiter load is high-load when the 212 is disposed in the release position.

In the present exemplary embodiment the pawl 212 is disposed between the lock position and the restricting portion. However the pawl 212 may be disposed in either the lock position or the release position.

What is claimed is:

1. A webbing take-up device comprising:
    a spool on which a webbing adapted to be fitted over an occupant is taken up, and that is rotated in a pullout direction by pulling out the webbing, wherein rotation of the spool is restricted in the pullout direction under specific circumstances;
    a force limiter mechanism having first and second energy absorbing portions that permits rotation of the spool in the pullout direction when a force limiter load or a higher load is imparted while the rotation of the spool in the pullout direction is restricted;
    a lock ring that maintains the force limiter mechanism in a low-load state when the lock ring is allowed to rotate when said specific circumstances occur but which switches the force limiter mechanism from a low-load state to a high-load state when prevented from rotating under said specific circumstances;
    a switching member that is in a disposed position and connected to a solenoid, the disposed position including an initial position in contact with but out of arresting engagement with said lock ring when the solenoid is not in operation, the initial position of the switching member being located between a first position out of contact with said lock ring and a second position in arresting engagement with said lock ring, and the switching member being capable of moving to either the first position or the second position;
    wherein, when the solenoid is operated, the disposed position of the switching member is switched from the initial position to the first position and the force limiter load is not switched from a low-load to a high load;
    wherein the lock ring disposes the switching member at the initial position, wherein, when the solenoid is not in operation, the disposed position of the switching member is switched from the initial position to the second position by movement of the lock ring and the force limiter is switched from the low-load to the high-load, and
    wherein in said low-load state the force limiter mechanism resists rotation of the spool with only one energy absorbing portion, and in said high-load state the force limiter mechanism resists rotation of the spool with both said of energy absorbing portions.

2. The webbing take-up device of claim 1, wherein the switching member is disposed in the second position by a biasing force when the solenoid is not in operation.

* * * * *